United States Patent

[11] 3,591,190

[72] Inventors Fred Winay
829 Amherst Road, Linden, N.J. 07036;
Peter F. Kalksma, 583 Dover Street,
Paramus, N.J. 07652
[21] Appl. No. 828,451
[22] Filed May 23, 1969
[45] Patented July 6, 1971

[54] CLINCH SEALS
5 Claims, 4 Drawing Figs.
[52] U.S. Cl. .................................................. 277/147,
285/189, 277/164, 52/220
[51] Int. Cl. ...................................................... F16j 9/06,
F16l 19/00
[50] Field of Search............................................ 277/178,
152, 226, 235, 34.3, 147, 164; 285/121, 189, 196,
288; 52/396, 220

[56] References Cited
UNITED STATES PATENTS
2,914,350  11/1959  Smith ................................ 277/226
2,958,551  11/1960  Rogers .............................. 277/152 X
FOREIGN PATENTS
1,391,923  2/1965  France ............................... 277/34.3

Primary Examiner—Samuel Rothberg
Attorney—Popper, Bain, Bobis & Gilfillan

ABSTRACT: A clinch seal concrete structure provided with an access hole for a conduit, wherein the access hole is defined by a fluid impervious, elastic sheet imbedded in the concrete structure around the access hole; the sheet provided with a hole; a tubular border surrounding the hole in the sheet, and a contractable strap in the tubular border, whereby the hole in the sheet may be contracted to clinch a conduit inserted therein in sealing engagement.

PATENTED JUL 6 1971 3,591,190
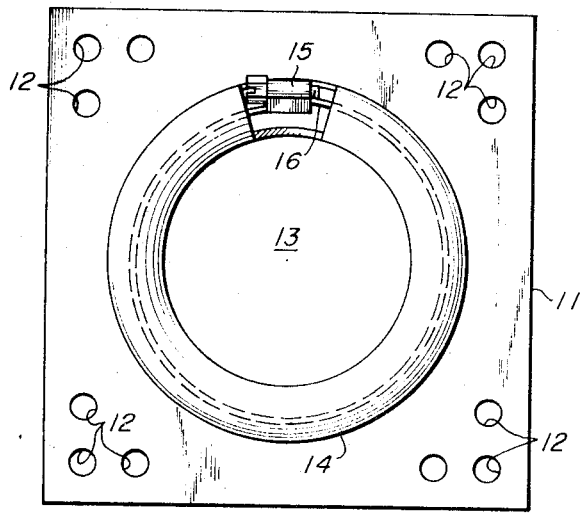
FIG. 1
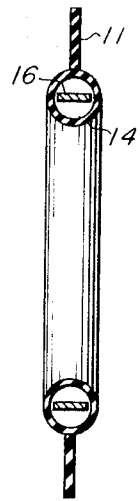
FIG. 2
FIG. 3
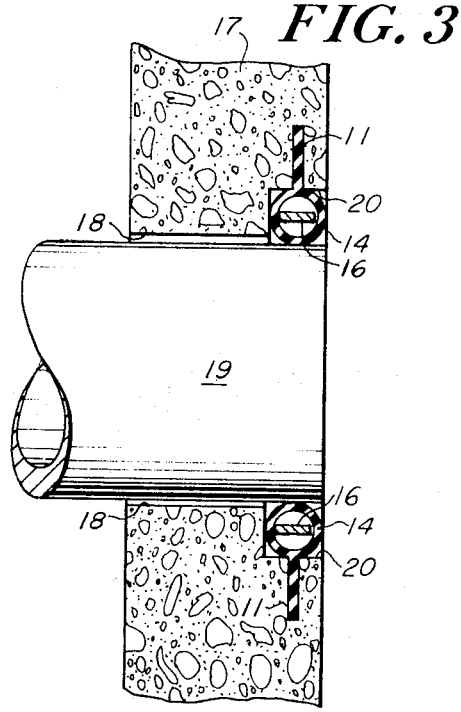
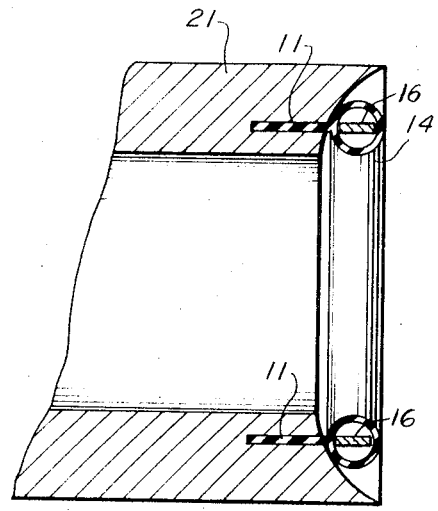
FIG. 4
INVENTORS
FRED WINAY
PETER F. KALKSMA
BY
Popper, Bain, + Bobis
ATTORNEYS

CLINCH SEALS

BACKGROUND OF INVENTION

1. Field of Invention

This invention relates generally to clinch seals, and specifically to concrete structures having a port which may be contracted and locked onto a conduit communicating with the concrete structure.

2. Prior Art

Precast reinforced concrete manholes are in wide general use. They usually are made in a plurality of sections. There is a base, ordinarily tubular with a closed bottom, and one or more inlet or outlet ports. Above the base, there may be one or more superposed precast reinforced concrete risers, surmounted by a precast reinforced tapered top section referred to as the manhole cover. A frame and manhole cover are applied to the top, and manhole steps are imbedded in the sections to enable one to climb up and down in the manhole.

The intake and outlet ports in the base have conduits applied thereto which must be sealed to the base against leakage. This is ordinarily accomplished by inserting a filling of setting material or caulkage, but the seals so attained often deteriorate.

SUMMARY OF INVENTION

It has been found that a tight seal between the access hole of a concrete structure and a conduit can be attained by imbedding an elastic sheet in the concrete structure.

The elastic sheet is provided with an aperture having a tubular border into which a cinch ring is inserted, with an aperture in the border for reading and adjusting the cinch ring. Thus, when a conduit is inserted in the aperture in the sheet into the access hole, the cinch ring may be adjusted to seize the conduit and seal the access hole.

THE DRAWINGS

These objects and advantages as well as other objects and advantages may be attained by the device shown by way of illustration in the drawings in which FIG. 1 is a front elevational view of a sheet prior to being imbedded in a concrete structure;

FIG. 2 is a partial cross-sectional view of the tubular central portion of the sheet surrounding an aperture and containing a cinch ring;

FIG. 3 is a vertical partial sectional view of a manhole showing the sheet engaged in sealing relation with a conduit; and FIG. 4 is a partial sectional view of the sheet applied to a conduit.

PREFERRED EMBODIMENT

Referring now the the drawings in detail, the internal contractable seal provides a sheet 11. This sheet 11 may be generally square, although its precise shape is not critical. The marginal portions of the sheet may have numerous holes 12 which will serve to lock the sheet in position when it is imbedded in a concrete structure as shown in FIGS. 3 and 4.

The sheet has a central aperture 13. The aperture is surrounded by a tubular, integral annulus 14. The annulus 14 has an access hole 15. Into the access hole, a cinch ring or adjustable clamp 16 is inserted. Numerous clamps are available commercially and more particularly identified by U.S. Pat. Nos. 3,100,327, Spector, 8–13–63 and 3,162,921, Cheris, 12–29–64. The adjustable clamp 16 or cinch ring may be reached through the access hole 15 and may be adjusted and shortened so as to contract the diameter of the aperture 13 in the sheet 11.

The sheet 11 may perform its function by being positioned in a poured concrete mix such as the manhole wall structure 17, so that the aperture 13 is in general registration with an aperture 18 in the manhole wall structure.

When a conduit 19 is inserted into the aperture (chain hole) of a manhole wall structure 17, the clinch ring 16 may be tightened until the annulus 14 has been contracted sufficiently to seize the conduit 19. An effective seal is attained.

Since the annulus 14 must contract elastically, the sheet must be made of some material such as rubber, synthetic rubber, or any other of the numerous elastomeric synthetic materials now readily available to the trade.

In FIG. 3, there is shown an annular seat or channel 20, for the annulus to be seated in the channel 20 surrounding the aperture in the concrete structure. The sheet 11 has its ends set in the poured concrete.

In FIG. 4, the sheet 11 is tubular instead of flat and it is imbedded in a tubular conduit 21. The contractable annulus 14 accomplishes a tight seal between a conduit and a poured concrete structure.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention.

What we claim is:

1. A clinch seal comprising
   a. a body having an aperture therein,
   b. an elastic annulus positioned generally in the aperture,
   c. an integral radial flange extending outwardly from the annulus,
   d. the flange imbedded in the body around the aperture,
   e. a clinch ring in the annulus whereby it may be contracted,
   f. an access passage in the annulus to permit the contraction of the clinch ring.

2. The device according to claim 1 in which the flange is provided with a plurality of perforations.

3. The device according to claim 1 in which the plane in which the annulus lies and the plane in which the flange lies imbedded in the body, are generally identical.

4. The device according to claim 1 in which the plane in which the annulus lies and the plane in which the flange lies imbedded in the body, are different.

5. A clinch seal comprising:
   a. a sheet having an aperture therein,
   b. a body having an aperture therein,
   c. the sheet sealed in the body with the respective apertures of the sheet and the body in general registration with each other,
   d. an elastic annulus attached to the sheet surrounding the aperture,
   e. an adjustable clinch ring in the annulus,
   f. an access passage in the annulus to enable the contraction of the clinch ring, to engage a conduit inserted into the apertures and to seize and seal therewith,
   g. a conduit in the apertures, and seized by the clinch ring.